United States Patent
Sun et al.

(10) Patent No.: US 10,155,408 B2
(45) Date of Patent: Dec. 18, 2018

(54) OPTICAL ANTI-COUNTERFEITING ELEMENT, PRODUCT USING SAME AND PREPARATION METHOD THEREFOR

(75) Inventors: Kai Sun, Beijing (CN); Xiaoli Wang, Beijing (CN); Jun Zhu, Beijing (CN); Xinyi Li, Beijing (CN); Xin Qu, Beijing (CN); Weiwei Zhang, Beijing (CN)

(73) Assignees: ZHONGCHAO SPECIAL SECURITY TECHNOLOGY CO., LTD, Beijing (CN); CHINA BANKNOTE PRINTING AND MINTING CORP., Beijing (CN)

(*) Notice: Subject to any disclaimer, the term of this patent is extended or adjusted under 35 U.S.C. 154(b) by 118 days.

(21) Appl. No.: 14/404,212

(22) PCT Filed: Jun. 12, 2012

(86) PCT No.: PCT/CN2012/076795
§ 371 (c)(1),
(2), (4) Date: Mar. 27, 2015

(87) PCT Pub. No.: WO2013/177828
PCT Pub. Date: Dec. 5, 2013

(65) Prior Publication Data
US 2015/0210106 A1      Jul. 30, 2015

(30) Foreign Application Priority Data
May 30, 2012   (CN) .......................... 2012 1 0174152

(51) Int. Cl.
*B42D 25/30*      (2014.01)
*B42D 25/328*    (2014.01)
(Continued)

(52) U.S. Cl.
CPC ............. *B42D 25/30* (2014.10); *B42D 25/29* (2014.10); *B42D 25/324* (2014.10);
(Continued)

(58) Field of Classification Search
CPC ........... B42D 15/00; B42D 15/10; G09C 3/00
(Continued)

(56) References Cited

U.S. PATENT DOCUMENTS 5,815,252 A      9/1998   Price-Francis
2003/0179364 A1  9/2003   Steenblik et al.
(Continued)

FOREIGN PATENT DOCUMENTS

CN       1854944 A       11/2006
CN       1906547 A        1/2007
(Continued)

OTHER PUBLICATIONS

International Search Report mailed in corresponding International Patent Application No. PCT/CN2012/076795 dated Mar. 7, 2013, consisting of 8 pp. (English Translation Provided).
(Continued)

*Primary Examiner* — Justin V Lewis
(74) *Attorney, Agent, or Firm* — Volpe and Koenig, P.C.

(57) ABSTRACT

An optical anti-counterfeiting element comprises a base material (11). The base material (11) has a first surface and a second surface which are opposite to each other. The first surface is covered thereon with a micro-sampling tool (12); one part of the second surface is a micro image-text formed by a micro relief structure (13), and the other part thereof is a flat structure which does not form a micro image-text and/or a micro relief structure (14) which is different from the micro relief structure forming the micro image-text. The flat structure which does not form the micro image-text and the micro relief structure (14) different from the micro relief
(Continued)

structure forming the micro image-text are homomorphically covered thereon with a first plating (15), the micro relief structure (13) forming the micro image-text is homomorphically covered thereon with a second plating (16), and the micro image-text is sampled by the micro sampling tool (12). Also provided is an anti-counterfeiting product using the optical anti-counterfeiting element and a preparation method therefor.

12 Claims, 2 Drawing Sheets

(51) Int. Cl.
    *B42D 25/29*     (2014.01)
    *B42D 25/324*     (2014.01)
    *B42D 25/40*     (2014.01)
    *G02B 3/00*     (2006.01)
    *G02B 5/18*     (2006.01)
    *G07D 7/12*     (2016.01)
    *B42D 25/45*     (2014.01)
    *B42D 25/373*     (2014.01)
    *G07D 7/00*     (2016.01)

(52) U.S. Cl.
    CPC ......... *B42D 25/328* (2014.10); *B42D 25/373* (2014.10); *B42D 25/40* (2014.10); *B42D 25/45* (2014.10); *G02B 3/0006* (2013.01); *G02B 5/1842* (2013.01); *G07D 7/003* (2017.05); *G07D 7/12* (2013.01)

(58) Field of Classification Search
    USPC .................................. 283/72, 74, 94, 98, 901
    See application file for complete search history.

(56) References Cited

U.S. PATENT DOCUMENTS

| | | |
|---|---|---|
| 2006/0077496 A1 | 4/2006 | Argoitia et al. |
| 2008/0036196 A1 | 2/2008 | Steenblik et al. |
| 2008/0094713 A1 | 4/2008 | Tompkin et al. |
| 2008/0259416 A1* | 10/2008 | Peters ...................... G02B 5/18 359/2 |
| 2009/0102179 A1 | 4/2009 | Lo |
| 2010/0307705 A1 | 12/2010 | Rahm et al. |
| 2011/0007374 A1 | 1/2011 | Heim |
| 2013/0056971 A1* | 3/2013 | Holmes ................ B42D 25/351 283/74 |

FOREIGN PATENT DOCUMENTS

| | | |
|---|---|---|
| CN | 101368352 A | 2/2009 |
| CN | 101767511 A | 7/2010 |
| CN | 101850680 A | 10/2010 |
| CN | 101952128 A | 1/2011 |
| CN | 201829132 U | 5/2011 |
| GB | 2456432 A | 7/2009 |
| WO | WO 2011107783 A1 * | 9/2011 ........... G07D 7/0006 |

OTHER PUBLICATIONS

Kamal, Hala et al. "Properties of moiré magnifiers." Optical Engineering 37 (11) 3007-3014 (Nov. 1998) 7 pp.

* cited by examiner

US 10,155,408 B2

OPTICAL ANTI-COUNTERFEITING ELEMENT, PRODUCT USING SAME AND PREPARATION METHOD THEREFOR

CROSS REFERENCE TO RELATED APPLICATIONS

This application claims priority to Chinese Application No. 201210174152.4, filed on May 30, 2012, entitled "Optical Anti-Counterfeiting Element, Product Using the Same and Preparation Method therefor", which is specifically and entirely incorporated by reference.

FIELD OF THE INVENTION

The present invention relates to an optical anti-counterfeiting field, in particular an optical anti-counterfeiting element, product using the same and preparation method thereof.

BACKGROUND OF THE INVENTION

An article, such as bank note, identity document and negotiable securities, is vulnerable to simulation and counterfeit due to its high added value. Optical anti-counterfeiting technologies (e.g., holography, optical variability and micro-lens array) are widely applied to facilitate the general public identify authenticity of the document with high added value and resist the reproduction thereof performed by means of the current digital-technology.

The micro-lens array anti-counterfeiting technology is applied to perform sampling on the corresponding micro image by utilizing the micro-lens as a micro-sampling tool, it may manifest a dynamic and magnified image which has animation effects and is visible for human eyes by means of designing sampling points under different viewing angles. The animation effects comprises orthogonal dynamic, sink, float, three-dimensional sense, rotation, scaling, dual channel, and likes (please refer to patent document US2008/0036196A1). When the micro-lens array anti-counterfeiting technology is specifically applied, it may be combined with the technology of Moire magnifiers (see article: "Properties of moire magnifiers", Hala Kamal, Reinhard Volkel and Javier Alda, *Optical Engineering*, Vol. 37, No. 11, pp 3007-3014, publicized on November 1998), and a plurality of above animation effects are generated by means of periodically arranged micro-lens (i.e., a micro-sampling tool) and a micro image which is periodically arranged and having a period which is similar with that of the micro-lens, wherein the micro image is located near the focal point of said micro-lens.

The micro image and the background shall have sufficient contrast such that they can be easily identified under a variety of environments, that is, it is necessary to colorize the micro image. Given that the structure of desirable micro image is very fine (about a few microns), such an accuracy grade is unreachable by utilizing a general printing technology. There are two colorizing methods at present, one method is disclosed in patent documents (e.g., CN1906547A) as follows: forming grooves with a certain depth in the micro image region, filling the grooves with ink by means of the blade coating processes, and the excessive materials which are located beyond the micro image region shall be substantially removed. In order to obtain a favorable colorizing effect, this method is significantly restrictive on the width of lines and depth of grooves of the micro image as well as matching relationship therebetween. Another method is applied based on the micro-nano structure, for instance, patent document US20030179364 discloses a solution of performing a black colorization of the micro image by means of an optical absorbing structure with a high width-to-depth ratio, and the patent document US20100307705A1 discloses a solution of performing a colorization on the micro image by filling with nanoparticles or benched metallic nanostructure.

However, the above-mentioned colorizing methods can hardly reach a colorful tinting, or can hardly be applied in the production (for example, the benched structure and the manner that the coating only covers the flat surface of micro image).

SUMMARY OF THE INVENTION

In view of the above defects in the prior art, it is an object of the present invention to provide an optical anti-counterfeiting element which can overcome above defects, product using the same and preparation method thereof.

The present invention provides an optical anti-counterfeiting element comprising a base material, the base material has a first surface and a second surface which are opposite to each other; the first surface is covered thereon with a micro-sampling tool, one part of the second surface is a micro image formed by a micro relief structure, and the other part of the second surface is a flat structure which does not form a micro image and/or a micro relief structure which is different from the micro relief structure forming the micro image; the flat structure and the micro relief structure different from the micro relief structure forming the micro image are conformably covered thereon with a first coating, the micro relief structure forming the micro image is conformably covered thereon with a second plate, and the micro image is sampled by the micro sampling tool.

The present invention also provides an anti-counterfeiting product using the above optical anti-counterfeiting element.

The present invention further provides method for preparing an optical anti-counterfeiting element, the method comprising: providing a base material having a first surface and a second surface which are opposite to each other; forming a micro-sampling tool on the first surface of said base material; forming a micro image formed by a micro relief structure on one part of the second surface of said base material, and forming a flat structure which does not form a micro image and/or a micro relief structure which is different from the micro relief structure forming the micro image on the other part the second surface of said base material; and conformably covering the flat structure which does not form the micro image and the micro relief structure different from the micro relief structure forming the micro image with a first coating thereon, and conformably covering the micro relief structure forming the micro image with a second plate thereon.

Given that the optical anti-counterfeiting element and the anti-counterfeiting product of the present invention utilize a micro image formed by a micro relief structure and a coating conformably covering said micro image, and the region beyond the micro image is a flat structure which does not form a micro image and/or a micro relief structure which is different from the micro relief structure forming the micro image, the present invention enables the region of the micro relief structure forming the micro image and the other region which does not form a micro image manifest obviously different visual and optical effects, such as different color, different texture and different variation, and realize a complete colorization of the micro image and magnified dynamic image, and perform an integration of a plurality of anti-counterfeiting features, thereby produce a stronger attraction to the public and a higher anti-counterfeiting capability. In addition, the optical anti-counterfeiting element and anti-counterfeiting product of the present invention may be mass produced by means of the general-purpose equipment in the field.

BRIEF DESCRIPTION OF THE DRAWINGS

The person skilled in the art would expressly understand the features and advantages of the present invention from the following drawings and detailed description. However, it shall be noted by the person skilled in the art that the following drawings are not plotted proportionately, so as to clearly manifest the structural features.

FIG. 4 is a schematic diagram illustrating a highly anti-counterfeiting document using an optical anti-counterfeiting element of the present invention by means of embedding windowed security thread, and sticking a film and a label on a window, and the like;

DETAILED DESCRIPTION OF THE PREFERRED EMBODIMENTS

An optical anti-counterfeiting element, product using the same and preparation method thereof according to the present invention are detailed below with reference to the drawings.

Figure 1:
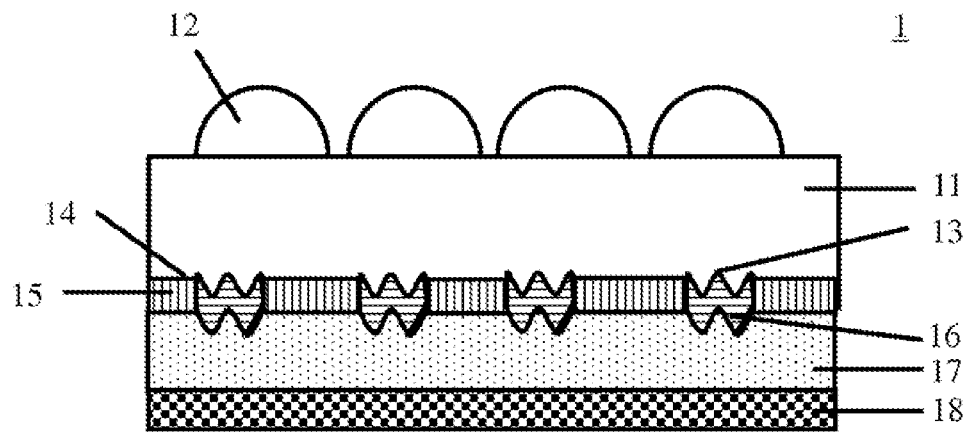
FIG. 1 is a diagram illustrating a cross-sectional view of the optical anti-counterfeiting element according to an embodiment of the present invention.

As shown in FIG. 1, an optical anti-counterfeiting element 1 according to an embodiment of the present invention comprises a base material 11 having a first surface and a second surface which are opposite to each other, wherein the first surface is covered thereon with a micro-sampling tool 12; one part of the second surface is a micro image formed by a micro relief structure 13, and the other part of the second surface is a flat structure which does not form a micro image and/or a micro relief structure 14 which is different from the micro relief structure forming the micro image. The flat structure which does not form the micro image and the micro relief structure 14 different from the micro relief structure forming the micro image are conformably covered thereon with a first coating 15, the micro relief structure 13 forming the micro image is conformably covered thereon with a second plate 16, and the micro image is sampled by the micro sampling tool 12. As in the optical anti-counterfeiting element 1 according to the present invention, the region of the micro relief structure 13 forming the micro image and the other region of the flat structure which does not form the micro image and/or the micro relief structure 14 different from the micro relief structure forming the micro image may manifest an obvious visual contrast. In addition, when the second surface is observed with a micro-sampling tool 12, an observer may witness an image of the magnified and colorful micro image with a variety of animation effects.

In one preferred embodiment according to the present invention, the micro-sampling tool 12 may be a micro-lens array, such as any one of cylindrical lens array, spherical lens array and Fresnel lens array or a combination thereof. Certainly, the micro-sampling tool 12 may be other type of micro-lens array, only if it can perform sampling of the micro image. In addition, the configuration of said micro-sampling tool 12 is preferably matched with the configuration of the micro image 13. However, the person skilled in the art may understand that the configuration of said micro-sampling tool 12 is not necessarily matched with that of the micro image 13 for each other, only if the configurations of said micro-sampling tool 12 and micro image 13 can achieve the expected anti-counterfeiting effect.

In one preferred embodiment according to the present invention, the micro relief structure (e.g., the micro relief structure 13 forming the micro image, and the micro relief structure 14 which does not form the micro image and is different from the micro relief structure forming the micro image) may include any one of diffraction grating, random scattering structure and sub-wavelength grating or a combination thereof. When the micro relief structure 13 forming the micro image is a one-dimensional diffraction grating and the micro-sampling tool 12 is a one-dimensional micro-lens array, the intersection angle between the direction of said one-dimensional micro-sampling tool 12 and the direction of said one-dimensional diffraction grating is within the range of 30° to 90°, so as to avoid the defect of decolorization due to that the one-dimensional micro-lens array collects light diffracted by the one-dimensional diffraction grating with different colors along multiple directions.

In one preferred embodiment according to the present invention, the first coating 15 and the second coating 16 may be the same or different coating. However, it is preferably that the structure of said first coating 15 and the structure of said second coating 16 are different when the micro relief structure 13 forming a micro image is a sub-wavelength micro relief structure having a large depth-to-width ratio. The reflective brightness can be enhanced by means of covering the region forming a micro image and other region which does not form a micro image with a coating structure.

In one preferred embodiment according to the present invention, each of the first coating 15 and the second coating 16 may include any one of following coating or a combination thereof: mono-layer metal coating; multi-layer metal coating; a coating formed by a stack of an absorbing layer, a dielectric layer with lower refractive index and a reflecting layer, wherein the absorbing layer contacts with the micro relief structure; a coating of dielectric layer with high refractive index; a coating of multi-dielectric layer formed by a stack of a first dielectric layer with high refractive index, a dielectric layer with lower refractive index and a second dielectric layer with high refractive index in sequence; and a coating formed by stacking an absorbing layer, a dielectric layer with high refractive index and a reflective layer in sequence, wherein the absorbing layer contacts with the micro relief structure. In an embodiment of the present invention, a high refractive index refers to that the refractive index is equal or greater than 1.7, a lower refractive index refers to that the refractive index is less than 1.7. The material of metal coating may be gold, silver, copper, aluminum, ferrum, tin, zinc, nickel, chromium or an alloy thereof; the material of dielectric layer with high refractive index may be ZnS, TiN, $TiO_2$, TiO, $Ti_2O_3$, $Ti_3O_5$, $Ta_2O_5$, $Nb_2O_5$, $CeO_2$, $Bi_2O_3$, $Cr_2O_3$, $Fe_2O_3$, $HfO_2$, ZnO, and the like; the material of dielectric layer with lower refractive index may be $MgF_2$, $SiO_2$ and the like; the material of said absorbing layer may be chromium, nickel, copper, cobalt, titanium, vanadium, tungsten, tin, silicon, germanium, or a mixture or an alloy thereof; the material of said reflective layer may be gold, silver, copper, aluminum, or a mixture or an alloy thereof.

In one preferred embodiment according to the present invention, as shown in FIG. 1, the first coating 15 and the second coating 16 are covered thereon with an isolation layer 17 which plays an isolated role, the surface of said isolation layer 17 is flattened. The isolation layer 17 can enhance visual brightness and serve to protect the coating. In addition, the isolation layer 17 is formed by material with lower refractive index. As regards the above-described coating structure of a layer formed by the material which does not contain metal, the micro relief structure (e.g., a grating structure) may be flattened by means of non-conformably covering the structure with said isolation layer 17 with lower refractive index.

In one preferred embodiment according to the present invention, as shown in FIG. 1, the isolation layer 17 may be covered thereon with a first absorbing layer 18, wherein the first absorbing layer 18 is preferably black, blue, purple or other color with lower brightness.

In one preferred embodiment according to the present invention, any one of the first coating 15 and the second coating 16 may be formed with a demetallization structure therein, wherein the demetallization structure may form macro image-text or character with any shape, the size of line feature of said demetallization structure is preferably within a range of 0.05-10 mm. The demetallization structure may be fabricated with three technologies as follows: 1) fabricating with a mode of lift-off, that is, initially coating or printing lift-off layer in a predetermined region according to the design of demetallization pattern, the lift-off layer is dissolved in a certain kind of solvent, subsequently producing the coating, and finally dissolving and removing said lift-off layer and coating with a solvent, thereby achieve the purpose of demetallizing said structure; 2) fabricating with a mode of local evaporation, that is, initially printing an oil layer according to the design of demetallization pattern, subsequently connecting lines to produce a coating, the coating is not attached on the region of oil layer due to volatility and low surface energy of said oil layer, thereby achieve the purpose of demetallizing said structure; 3) fabricating with a mode of masking protection, that is, initially producing an integral coating, subsequently printing masking layer according to the design of demetallization pattern, and finally washing said coating in a corrosive solution, the presence of said masking layer results in that the coating underneath said masking layer will not be washed and removed by the corrosive solution, thereby achieve the purpose of demetallizing said structure.

Figure 2:
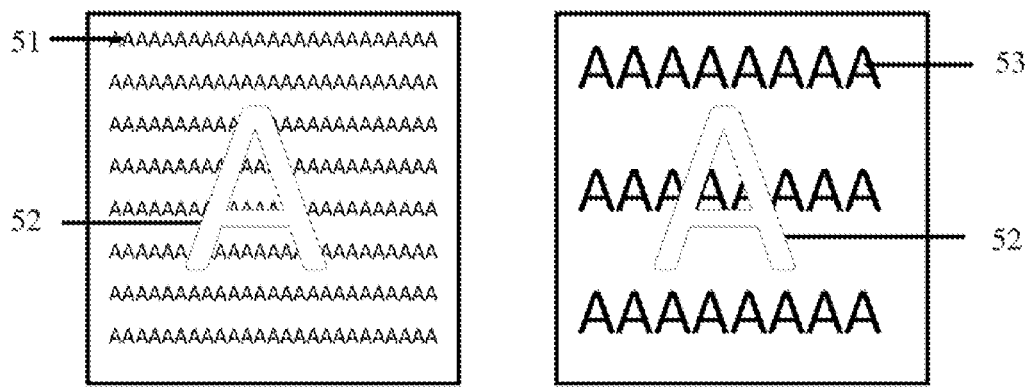
FIG. 2(a) and FIG. 2(b) are diagrams illustrating the plan view and magnified plan view of the optical anti-counterfeiting element according to an embodiment of the present invention.

Combining the demetallization structure with the micro image may enhance anti-counterfeiting effect. FIG. 2(a) illustrates a plan view of the optical anti-counterfeiting element according to an embodiment of the present invention, wherein the reference number 51 indicates a micro image formed by the micro relief structure and the coating structure according to the present invention, the reference number 52 indicates a diagram formed by means of said coating structure, demetallization structure, and a combination of micro relief structure and coating structure, its specific shape and size may be designed according to the desirable effects, in addition, the pattern is a macro and visible image-text, and is not magnified by the micro-sampling tool 12. FIG. 2(b) is a diagram illustrating a plan view of the image of said pattern formed following the pattern magnified by the micro-sampling tool 12, wherein the reference number 53 indicates the image of said micro image 51 magnified by the micro-sampling tool 12, while the graph indicated by said reference number 52 remains unchanged before and after the magnification.

In order to enhance anti-counterfeiting effect, the shape design of said micro image 52 and macro graph 53 as illustrated in FIG. 2(a) may possess a certain kind of logical connection, for example, they are identical or similar, or they may be joined together to form an integral pattern; in addition, the color design of said micro image 52 and macro graph 53 as illustrated in FIG. 2(a) may possess a certain kind of logical connection, such as their colors are identical or complementary, so as to improve anti-counterfeiting effect.

As in a preferred embodiment according to the present invention, the base material 11 may be a colored or colorless film which is transparent to visible light, for example, it may be poly diol terephthalate, polyvinyl chloride (PVC), polyethylene (PE), polycarbonate, polypropylene, metal, glass and paper, and the like. The thickness of said base material 11 is preferably matching the focal distance of said micro-sampling tool 12.

Figure 3:
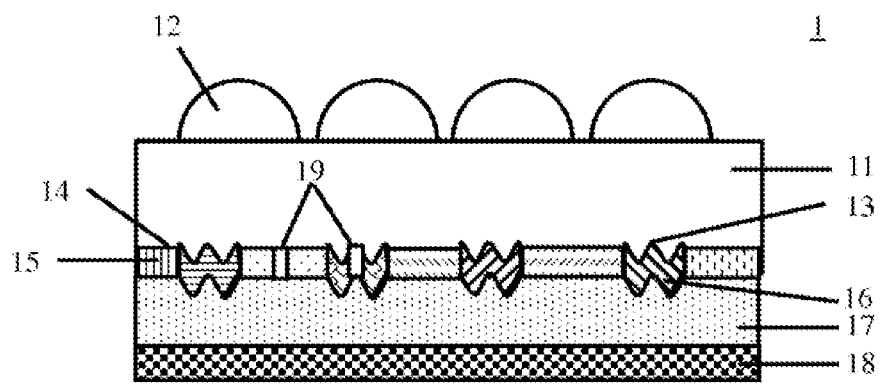
FIG. 3 is a diagram illustrating a cross-sectional view of the optical anti-counterfeiting element according to another embodiment of the present invention.

All kinds of said micro-sampling tool, coating structure, micro relief structure and demetallization structure may be combined arbitrarily, so as to achieve the desirable optical anti-counterfeiting effect, for example, both the region 13 of micro relief structure forming the a micro image and the other region 14 which does not form a micro image on the second surface of said base material 11 may use different coating structure, micro relief structure and demetallization structure, and the different regions on the first surface of said base material 11 may utilize different micro-sampling tool 12, it is schematically illustrated in FIG. 3. As shown in FIG. 3, the region 13 forming the micro image includes four parts, wherein the second coating 16 of the four parts uses different coating structure respectively; the region 14 which does not form a micro image contains five parts, wherein the first coating 15 of the five parts are formed by means of different coating structure; in addition, a demetallization structure 19 may be formed in both of the first coating 15 and the second coating 16.

A numbers of examples are described as follows.

For example, the micro relief structure 13 forming the micro image is a diffraction grating, the grating period is within a range of 0.7-2 µm, the shape of groove is substantially sinusoidal, the groove depth is within a range of 0.05-0.4 µm. The first coating 15 and the second coating 16 may be any one of said coating structure or a combination thereof. The micro-sampling tool 12 is a micro-cylinder-lens. The region which does not form a micro image is a flat structure 14. When the diffraction micro image is magnified by means of the micro-cylinder-lens 12, it may manifest iridescence, while the region does not have diffraction grating exhibits a metal reflective effect with a certain color.

For another example, the micro relief structure 13 forming the micro image is a structure which produces a uniform and random scattering to the visible light, wherein the transverse and longitudinal size of the scattering structure are in a random distribution, the sizes do not have a fixed period, the transverse feature size may be within a range of 0.1-5 µm. The first coating 15 and the second coating 16 may be any one of said coating structure or a combination thereof. The region which does not form a micro image is a flat structure 14. By applying such an optical anti-counterfeiting element, the region of scattering structure (i.e., the region of said micro relief structure 13 forming a micro image) presents a matte and rough appearance, the region lacking scattering structure (i.e., a flat region 14) manifests a specular, bright and metallic texture, the two regions may exhibit obviously different visual effects after the regions are magnified by said micro-sampling tool 12.

For another example, the micro relief structure 13 forming the micro image is a sub-wavelength grating, the period of said sub-wavelength grating is within a range of 0.2-0.5 µm, the shape of groove is substantially sinusoidal, the groove depth is within a range of 0.06-0.3 µm; the region which does not form a micro image is a flat structure 14; both the first coating 15 and the second coating 16 are dielectric layers with high refractive index, its thickness is within a range of 0.05-0.5 µm; both of the first coating 15 and the second coating 16 are covered thereon with an isolation layer 17 with a lower refractive index (i.e., the refractive index is less than 1.7), and the isolation layer 17 flattens the fluctuation of said sub-wavelength grating, that is, the surface of said isolation layer 17 is a flat surface; the isolated layer is covered thereon with a first absorbing layer 18, the first absorbing layer 18 is preferably black, blue, purple or other color with lower brightness. Following the magnification performed by said micro-sampling tool 12, the region of the micro relief structure 13 forming a micro image manifests a bright color due to zero-order diffraction, while the region of the flat structure 14 exhibits a bleak color of the absorbing layer. As a specific example, the period of said sub-wavelength grating is 0.34 µm, the shape of groove is sinusoidal, the groove depth is 0.19 µm; the first coating 15 and the second coating 16 are $TiO_2$ coatings, its thickness is 0.11 µm; the refractive index of said isolation layer 17 is 1.55, its average height is 1.5 µm; the first absorbing layer 18 is a black coating which is almost completely absorptive to the visible light waveband. Following a magnification performed by the micro-sampling tool 12, the image of said region of sub-wavelength grating appears yellow, and the image of said flat region appears blue, the two colors manifest an obvious contrast. If the micro-sampling tool 12 is a micro-cylinder-lens, and its direction is perpendicular with the direction of said sub-wavelength grating, it may generate an integration of the animation and optical variation; that is, when the magnified image is obliquely observed regarding the direction of said sub-wavelength grating as an axis, the image does not produce an animation, but the image of said micro relief structure region is turned from yellow to blue; when the image of said micro relief structure region is obliquely observed regarding the direction of said micro-cylinder-lens as an axis, the image produces an animation, while its color is kept yellow.

For another example, the micro relief structure 13 forming the micro image is a sub-wavelength grating, the region which does not form a micro image is a flat structure 14; both the first coating 15 and the second coating 16 are above described structure of a stack of a first dielectric layer with high refractive index/a dielectric layer with lower refractive index/a second dielectric layer with high refractive index, both of the first coating 15 and the second coating 16 are covered thereon with an isolation layer 17 with a lower refractive index, the isolation layer 17 is covered thereon with a first absorbing layer 18. The thickness of said dielectric layer with high refractive index is within a range of 0.03-0.5 µm; while thickness of said dielectric layer with lower refractive index is within a range of 0.1-0.5 µm. Following the magnification performed by said micro-sampling tool 12, the region of sub-wavelength grating manifests a bright color due to zero-order diffraction, while the region of the flat structure 14 exhibits a bleak color of the absorbing layer. The optical anti-counterfeiting element using said structure may perform an effect of "hidden when it is observed from the front, reappeared when it is observed from the side", for example, the period of said sub-wavelength grating is 0.34 µm, the shape of groove is sinusoidal, the groove depth is 0.18 µm; the first dielectric layer with high refractive index is TiN coating, its thickness is 0.05 µm; the dielectric layer with lower refractive index is $Al_2O_3$ layer, its thickness is 0.18 µm; the second dielectric layer with high refractive index is $TiO_2$ layer, its thickness is 0.07 µm; the refractive index of said isolation layer 17 is 1.55, its average height is 1.5 µm; the first absorbing layer 18 is a black coating which is almost completely absorptive to the visible light waveband; following a magnification performed by the micro-sampling tool 12, the image of said region of sub-wavelength grating appears yellow, and the image of said flat region also appears an analogous color of yellow; when an observer watches in an oblique angle, the image of said region of micro relief structure appears blue, while the region of flat structure turns green, the two colors manifest an obvious contrast. The optical anti-counterfeiting element using said structure may perform an effect of "hidden when it is observed from the front, reappeared when it is observed from the side", for example, the period of said sub-wavelength grating is 0.34 µm, the shape of groove is sinusoidal, the groove depth is 0.13 µm; the first dielectric layer with high refractive index is $TiO_2$ coating, its thickness is 0.1 µm; the dielectric layer with lower refractive index is $Na_3AlF_6$ layer, its thickness is 0.25 µm; the second dielectric layer with high refractive index is ZnS layer, its thickness is 0.04 µm; the refractive index of said isolation layer 17 is 1.55, its average height is 1.5 µm; the first absorbing layer 18 is a black coating which is almost completely absorptive to the visible light waveband; following a magnification performed by the micro-sampling tool 12, the image of said region of sub-wavelength grating appears yellow, while the image of said flat region appears blue-green; each image of two regions turn blue when it is observed from the side with an oblique angle of 20° is, it produce the effect of "hidden when it is observed from the front, reappeared when it is observed from the side".

For another example, the micro relief structure 13 forming the micro image is a sub-wavelength grating, the period of said sub-wavelength grating is within a range of 0.2-0.5 µm, the shape of groove is substantially sinusoidal, the groove depth is within a range of 0.06-0.3 µm; the region which does not form a micro image is a flat structure 14; both the first coating 15 and the second coating 16 are above-described coating structure of a stack of the absorbing layer/dielectric layer with high refractive index/reflective layer, wherein the material for said absorbing layer may be Cr, Cu, Ni, and the like, its thickness is within a range of 3-10 nm; the thickness of said dielectric layer with high refractive index is within a range of 0.03-0.5 µm; the material of said reflective layer may be Al, Ag, Cu, Cr, and the like, its thickness is larger than 0.01 µm. Following a magnification performed by the micro-sampling tool 12, the sub-wavelength grating region and said flat structure region manifest different colors. As a specific example, the period of said sub-wavelength grating is 0.25 µm, the shape of groove is sinusoidal, the groove depth is 0.1 µm; the material of said absorbing layer is Cr, its thickness is 5 nm; the dielectric layer with high refractive index is made of $TiO_2$, its height is 0.15 µm; the reflective layer is made of Al, its height is 0.03 µm; following a magnification performed by the micro-sampling tool 12, the image of said sub-wavelength grating region appears green, while the image of said flat structure region appears magenta, the two colors are complementary colors and produce an obvious contrast.

For another example, the micro relief structure 13 forming the micro image is a sub-wavelength grating, the region which does not form a micro image is a flat structure 14; both the first coating 15 and the second coating 16 are above-described coating structure of a stack of the absorbing layer/dielectric layer with lower refractive index/reflective layer. Following a magnification performed by the micro-sampling tool 12, the sub-wavelength grating region and said flat structure region manifest different colors. As a specific example, the period of said sub-wavelength grating is 0.35 µm, the shape of groove is sinusoidal, the groove depth is 0.15 µm; the material of said absorbing layer is Cr, its thickness is 5 nm; the dielectric layer with lower refractive index is made of $SiO_2$, its height is 480 nm; the reflective layer is made of Al, its height is 30 nm; following a magnification performed by the micro-sampling tool 12, the image of said sub-wavelength grating region appears gray, while the image of said flat structure region appears magenta, the two colors produce an obvious contrast.

For another example, the micro relief structure 13 forming the micro image is a sub-wavelength grating, the period of said sub-wavelength grating is within a range of 0.2-0.5 µm, the shape of groove is substantially sinusoidal, the groove depth is within a range of 0.4-5 µm, the depth-to-width ratio (i.e., the ratio of groove depth/period) of said sub-wavelength grating is greater than 1. The region which does not form a micro image is a flat structure 14. Both the first coating 15 and the second coating 16 at least include a metal layer which primarily plays a reflective role, wherein said metal layer of the first coating 15 and the second coating 16 are fabricated in the same production, but the metal layers have different depth, the difference of said depth is dependent on the depth-to-width ratio of said sub-wavelength grating, given that it is well known for the person skilled in the art with respect to the influence of depth-to-width ratio of said sub-wavelength grating on the thickness of two metal layers (e.g., as disclosed in patent document US2008/0094713A1), so unnecessary details would not be provided herein. In addition, both the first coating 15 and the second coating 16 are covered thereon with an isolation layer 17 with lower refractive index, thus the different thickness of said metal layers in the first coating 15 the second coating 16 will result in a high transmissivity (higher than 50%) of the region of micro relief structure 13 forming a micro image, while the region of flat structure 14 manifest a high reflective index (greater than 50%). Subsequently, by coating or printing with a first absorbing layer 18 (the first absorbing layer 18 is optional) whose color is compatible with the reflective color of said region of micro relief structure 13 forming a micro image, the region of micro relief structure 13 and the region of flat structure 14 manifest different color. Following a magnification performed by the micro-sampling tool 12, the region of micro relief structure 13 forming a micro image and the region of flat structure 14 exhibit different visual effects, such as different light transmittance or different color. As a specific example, the period of said sub-wavelength grating is 0.35 µm, the shape of groove is sinusoidal, the groove depth is 1.1 µm; the first coating 15 is above described structure of a stack of the reflective layer/dielectric layer with lower refractive index/absorbing layer, wherein the reflective layer is made of Cr, its height is 6 nm; the dielectric layer with lower refractive index is made of $SiO_2$, its height is 480 nm; the absorbing layer is made of Al, its thickness is 15 nm; the second coating 16 is above described structure of a stack of the reflective layer/ dielectric layer with lower refractive index/absorbing layer, wherein the reflective layer is made of Cr, its height is 1 nm; the dielectric layer with lower refractive index is made of $SiO_2$, its height is 80 nm; the absorbing layer is made of Al, its thickness is 2.5 nm; the refractive index of said isolation layer 17 is 1.55, its average height is 2 µm; the first absorbing layer 18 is green, following a magnification performed by the micro-sampling tool 12, the image of said sub-wavelength grating region appears a magnified image with a magenta color, while the flat structure region appears a magnified and green background color, the two colors are complementary thereby produce an obvious contrast.

Figure 5:
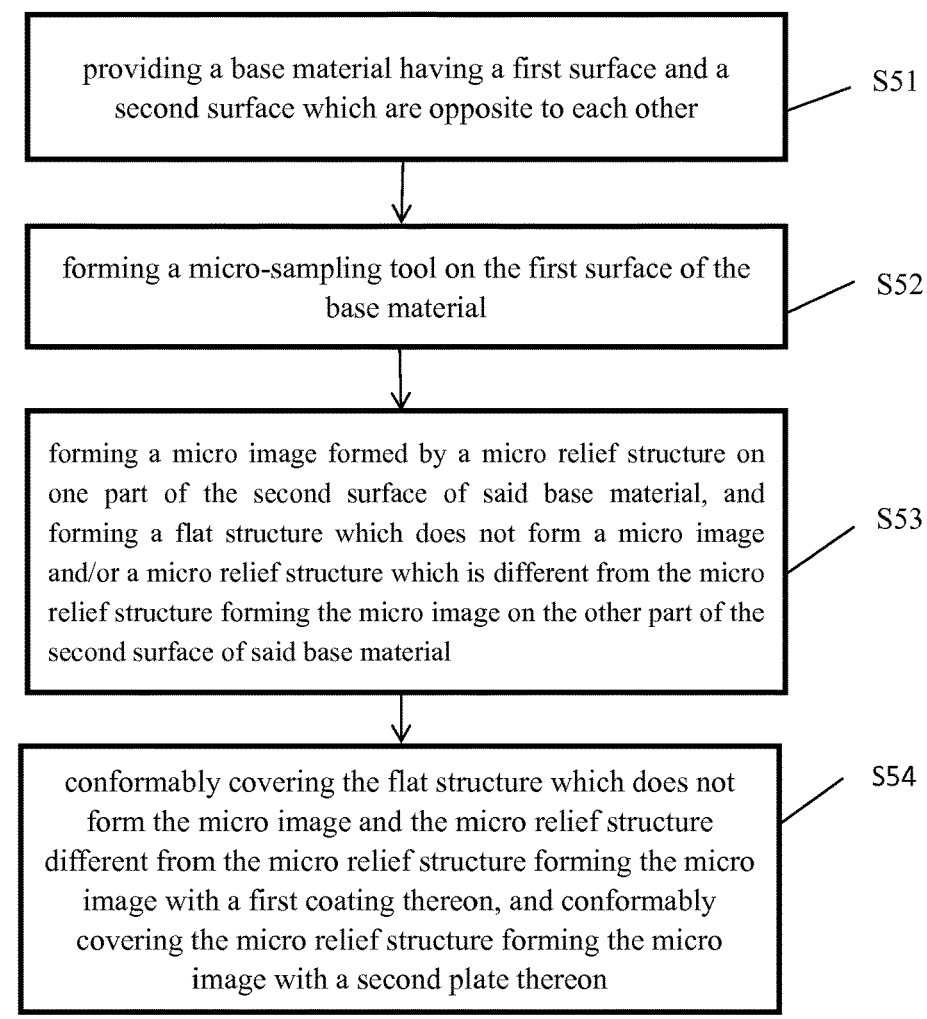
FIG. 5 is a flow diagram illustrating processes of a method for preparing the optical anti-counterfeiting element according to the present invention.

The present invention further provides a method for preparing an optical anti-counterfeiting element, as shown in FIG. 5, the method comprising following steps:

S51: providing a base material having a first surface and a second surface which are opposite to each other;

S52: forming a micro-sampling tool on the first surface of said base material;

S53: forming a micro image formed by a micro relief structure on one part of the second surface of said base material, and forming a flat structure which does not form a micro image and/or a micro relief structure which is different from the micro relief structure forming the micro image on the other part of the second surface of said base material; and S54: conformably covering the flat structure which does not form the micro image and the micro relief structure different from the micro relief structure forming the micro image with a first coating thereon, and conformably covering the micro relief structure forming the micro image with a second plate thereon;

wherein the above-mentioned micro relief structure and micro-sampling tool can be obtained by means of the general technologies in micro-machining and micro-manufacturing field, such as electron beam lithography, laser beam direct writing, two-beam interference, deep ultraviolet exposure, and then be reproduced on the base materials by means of embossing, casting and nanoimprinting, and the like in large scale. The mould plate may be a metal shim obtained by means of electroforming and electrocoating, or the mould plate made from the materials such as glass, ceramic, plastic and high molecular polymer, and the thermosetting materials or the materials cured by ultraviolet (or electron beam) radiation may be applied in the embossing process according to specific structural features. Wherein the micro relief structure and micro-sampling tool may have a structure of the above-described optical anti-counterfeiting element according to the present application, for details, please refer to the above-mentioned content.

The above-mentioned first coating and the second coating may be fabricated by means of physical deposition processes such as thermal evaporation, magnetron sputtering and laser ablation, as well as a variety of processes of chemical deposition or epitaxial growth. Wherein the first coating and the second coating may have a structure with reference to the above-described optical anti-counterfeiting element of the present application, unnecessary details would not be provided herein. In addition, the method for preparing an optical anti-counterfeiting element according to the present application may further comprises: forming a demetallization structure in the first coating and/or the second coating.

The demetallization structure may be fabricated with a mode of lift-off, a mode of local evaporation or a mode of masking protection.

In addition, the method for preparing an optical anti-counterfeiting element according to the present application may further comprises: forming an isolated layer having a flattened surface on the first coating and/or the second coating. Wherein the structure and beneficial effects of said isolated layer may be the structure and beneficial effects of above-described optical anti-counterfeiting element according to the present application, unnecessary details would not be provided herein.

After forming the isolated layer, the method for preparing an optical anti-counterfeiting element according to the present application may further comprises: forming a first absorbing layer on the isolated layer.

The above-mentioned non-conformably covered isolated layer and the first isolating layer 18 may be obtained by means of any customary coating and printing processes, and the material of said isolation layer 17 shall be the polymer which has good adhesion, as well as specific color or transparency, and its refractive index meet the requirement.

Figure 4:
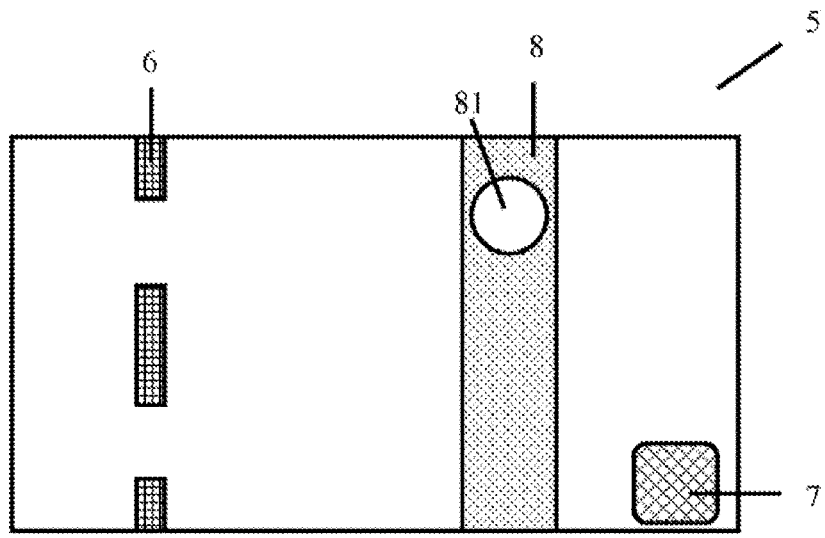

The optical anti-counterfeiting element according to the present invention can be applied on the products with high added value, such as bank note, identity document and negotiable securities, in addition, the anti-counterfeiting element can be applied on the products with high added value by means of embedding windowed security thread, and sticking a film and label on a window, and the like. For example, FIG. 4 is a schematic diagram illustrating a highly anti-counterfeiting document 5 using an optical anti-counterfeiting element according to the present invention with different modes. The optical anti-counterfeiting element may form windowed security line 6 by means of the prior art in the manufacturing technology of anti-counterfeiting paper, a segment of the windowed security lines 6 are embedded into the document 5, the remaining part is located on the surface of said document 5; the optical anti-counterfeiting element according to the present invention may be adhered to the surface of said document 5 by means of sticking a patch 7 thereon; the optical anti-counterfeiting element according to the present invention may be adhered to the surface of said document 5 by means of sticking a stripe 8 thereon, and the region which the stripe 8 resides in has a window 81, the shape and size of said window may be arbitrarily determined, the window 81 is acquired by removing a portion of said document 5, the transmission anti-counterfeiting features of said stripe 8 can be observed through the window 81. The document 5 may use any one of the windowed security lines 6, patch 7 and stripe 8 or any combination thereof.

It shall be understood that the above content merely describe the optical anti-counterfeiting element according to the present invention with a reference to the preferred embodiments. However, the person skilled in the art would be conscious of that they may perform a variety of modification and amendments on the present invention under a precondition that the modification and amendments do not deviate from the essential spirit and scope of the present invention.

The invention claimed is:

1. An optical anti-counterfeiting element comprising:
a base material,
the base material has a first surface and a second surface which are opposite to each other;
the first surface is covered thereon with a micro-sampling tool,
a part of the second surface is covered thereon with a micro image formed by a first micro relief structure, and
another part of the second surface is covered thereon with a flat structure being incapable of forming any micro image, and/or a second micro relief structure being different from the first micro relief structure;
the flat structure and/or the second micro relief structure are conformably covered thereon with a first coating having a same shape of the flat structure or the second micro relief structure, the first micro relief structure is conformably covered thereon with a second coating having a same shape of the first micro relief structure, and the base material is transparent to visible light and thickness of the base material matches the focal distance of the micro-sampling tool such that the micro image is sampled by the micro-sampling tool in the presence of ambient light,
wherein the first coating and the second coating are arranged side-by-side along the second surface, and
wherein the first coating or the second coating is formed with a demetallization structure therein.

2. The optical anti-counterfeiting element according to claim 1, wherein the micro-sampling tool is a micro-lens array.

3. The optical anti-counterfeiting element according to claim 1, wherein the structure of the first coating is the same as or different with the structure of the second coating.

4. The optical anti-counterfeiting element according to claim 3, wherein each of the first coating and the second coating includes any one of the following coatings or a combination thereof: mono-layer metal coating; multi-layer metal coating; a coating formed by an absorbing layer, a dielectric layer with a refractive index of less than 1.7 and a reflecting layer, wherein the absorbing layer contacts with the first micro relief structure or the second micro relief structure; a coating of dielectric layer with refractive index of at least 1.7; a coating of multi-dielectric layer formed by a stack of a dielectric layer with refractive index of at least 1.7, a dielectric layer with a refractive index of less than 1.7 and a dielectric layer with refractive index of at least 1.7 in sequence; and a coating formed by a stack of an absorbing layer, a dielectric layer with refractive index of at least 1.7 and a reflective layer of less than 1.7 in sequence, wherein the absorbing layer contacts with the first micro relief structure or the second micro relief structure.

5. The optical anti-counterfeiting element according to claim 1, wherein the first coating and/or the second coating are covered thereon with an isolated layer, the surface of said isolated layer is flattened.

6. The optical anti-counterfeiting element according to claim 5, wherein the isolated layer is covered thereon with a first absorbing layer.

7. An anti-counterfeiting product that uses the optical anti-counterfeiting element according to claim 1.

8. A method for preparing an optical anti-counterfeiting element according to claim 1, the method comprising:
providing a base material having a first surface and a second surface which are opposite to each other;
forming a micro-sampling tool on the first surface of the base material;
forming a micro image formed by a first micro relief structure on a part of the second surface of the base material, and forming a flat structure which does not form a micro image and/or a second micro relief structure which is different from the first micro relief structure on another part of the second surface of the base material;

conformably covering the flat structure and the second micro relief structure with a first coating having a same shape of the flat structure or the second micro relief structure thereon, and conformably covering the first micro relief structure with a second coating having a same shape of the first micro relief structure thereon; and forming a demetallization structure in the first coating or the second coating.

9. The method according to claim 8, wherein conformably covering of the first coating and the second coating result in the coatings having a same uniform thickness.

10. The optical anti-counterfeiting element according to claim 1, wherein the first coating and the second coating have a same uniform thickness.

11. The optical anti-counterfeiting element according to claim 1, wherein the first micro relief structure or the second micro relief structure includes any one of diffraction grating, random scattering structure and sub-wavelength grating or a combination thereof.

12. The optical anti-counterfeiting element according to claim 1, wherein the another part of the second surface is the second micro relief structure.

* * * * *